Dec. 20, 1960  G. F. CROESSANT  2,964,989
EXPANDING SCREW ANCHOR
Filed June 23, 1958

INVENTOR.
George Frederick Croessant.
BY
ATTORNEY.

United States Patent Office 2,964,989
Patented Dec. 20, 1960

2,964,989

EXPANDING SCREW ANCHOR

George Frederick Croessant, Temple, Pa., assignor to Croessant Machine Works, Inc., Temple, Pa.

Filed June 23, 1958, Ser. No. 743,663

3 Claims. (Cl. 85—2.4)

This invention relates to screw anchors and, more particularly, to improvements in screw anchors to adapt them for use in thin door panels and similar constructions in which conventional screw anchors are too long for insertion therein.

This application is a continuation-in-part of my co-pending patent application Ser. No. 566,198, filed Feb. 17, 1956, and now abandoned.

As shown in my prior Patent No. 2,559,281 it is old in the art to provide a composite screw anchor of somewhat cylindrical construction having a longitudinally slotted central portion, a threaded nut attached to one end thereof and a washer-like element attached to the other end thereof, the latter seating the head of a screw which is screw threaded to the nut whereby upon insertion of the screw anchor in a hole formed in a wall and turning of the screw by a screwdriver, the washer-like element and threaded nut will be moved towards each other and will collapse the arms of the slotted central portion to form laterally extending fingers or arms which press against the inner surface of the wall to hold the anchor securely in place even after the screw is removed.

An outstanding disadvantage of such construction is that it requires several different parts in the assembly thereof, which parts must be welded or otherwise secured together, thus adding to the cost. Another and more serious disadvantage of such construction is that it is unsuitable for use in door panels of small thickness or other structures requiring a very small overall length of the screw anchor. In short, screw anchors such as known in the art cannot be made in very short lengths because of their inherent construction and because of the fact that the metal of the tubular portion is entirely too thin to be threaded, therefore necessitating the addition of a threaded nut.

An object of the present invention is to provide a novel screw anchor which screw anchor can be made in one piece, therefore very cheaply, and at the same time will overcome the above named disadvantages and enable the use of the screw anchor in door panels having very small thickness as those of the order of 3/16 inch.

Another object of the present invention is to provide a screw anchor construction which enables threading of portions of the screw anchor even though the metal is initially too thin for screw threading.

A further object of the present invention is to provide a novel type of screw anchor which can be made easily and quickly by suitable dies so as to form essentially a one piece construction which considerably reduces manufacturing costs and at the same time enables the use of the screw anchor in walls or panels of varying and very small thickness.

A further object of the present invention is to provide a relatively short screw anchor which is so shaped as to insure collapsing in a radially outward direction with a minimum amount of torque applied to the expanding screw.

Other objects and advantages of the present invention will become more apparent from a study of the following description taken with the accompanying drawing wherein.

Figure 1:
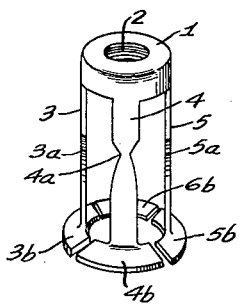
Fig. 1 is a perspective view of a screw anchor embodying the principles of my invention wherein the washer on the lower end is omitted for purposes of clarity of illustration.
Figure 2:
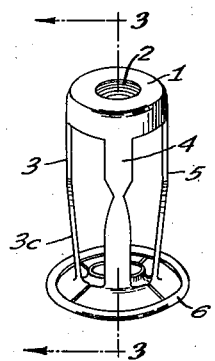
Fig. 2 is a view similar to Fig. 1 except showing in addition thereto a washer for holding the arcuate segments at the lower portions of the strips together.
Figure 3:
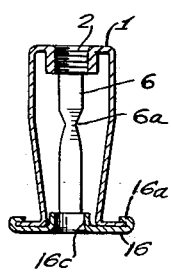
Fig. 3 is a vertical, cross-sectional view taken along 3—3 of Fig. 2.

Referring more particularly to Figs. 1, 2 and 3 of the drawing, numeral 1 denotes an annular portion of the screw anchor which screw anchor may be made from a single blank of aluminum or steel or other suitable metal, which has been stamped into the shape and formed by the method described in the above mentioned copending application. By such method, the depending central collar or tubular portion 2, which is internally threaded, may be made substantially thicker than the remaining portion of the screw anchor. Extending from the annular portion 1 are a plurality of integral, longitudinally extending strips 3, 4, 5 and 6. Although four of such strips are shown, for purpose of illustration, it will be understood however that the number may be three or perhaps five or six, if desired. Strips 3, 4, 5 and 6 are preferably weakened in an intermediate portion thereof, either by reducing the width or cross-section, or by scoring, stamping out holes, or other means. In the illustration shown, the intermediate portions are weakened by virtue of a substantial reduction in width, such as at 3a, 4a, 5a and 6a.

From the lower end portions of strips 3, 4, 5 and 6 there are integally formed arcuate segments 3b, 4b, 5b and 6b, which extend radially outwardly at right angles to the strips and which are arranged to form a circle with small gaps provided between the ends of the segments that form the circle.

An important feature of the present invention is that the arcuate segments 3b, 4b, 5b and 6b, are so arranged that when gaps are present between the segments, as shown in Fig. 1, the strips 3, 4, 5 and 6 form essentially a cylindrical outline. However, in the process of applying the washer-like element 6 and crimping the peripheral portion 16a onto the bottom portion of the screw anchor, that is, onto the segments 3b, 4b, 5b and 6b, the lower portions of the arms or strips 3, 4, 5 and 6, are moved inwardly at an angle, as shown more clearly in Fig. 3. Therefore the end portions of the arcuate segments 3b, 4b, 5b and 6b will come into contacting relationship and form a very rigid end portion of the screw anchor. The washer-like element 6 is turned upwardly and radially inwardly, by suitable machinery to form a peripheral lip or bead at 16a and the internal diametrical portion thereof is turned upwardly to form an annular boss portion or collar 16c, through which shank 8 of a screw may be inserted for screw threading into collar 2 as shown in Fig. 4.

Fig. 2 shows the completed assembly and shows more clearly how the lower portions, such as 3c, are disposed at an angle with respect to the upper portions of the strips from the point at which the strips are reduced in cross-section.

Figure 4:
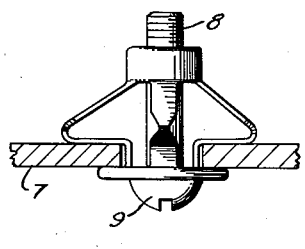
Fig. 4 is an elevational view showing the screw anchor embodying the present invention in the expanded position as effected by turning of the screw shown therein.

As a result of the above construction, it will be seen that when the screw anchor is inserted into a hole in a door panel or wall 7 and a screw is inserted through the opening formed by collar 16c and into the screw threaded portion of part 2, then upon turning the head 9 of the screw clockwise, the annular portion 1 is moved toward the washer 6 and in so doing the arms 3, 4, 5 and 6, are spread radially outwardly and become collapsed in the manner shown in Fig. 4. It will be particularly noted that by virtue of the initial radial outward positioning of the weakened portions 3a, 4a, 5a and 6a, as compared to the lower end portions, turning of the screw 9 will require very little effort to collapse the strips as compared to the case in which the strips are perfectly straight or in a cylindrical pattern. It will also be noted that such radial inward flare of the lower portions of the strips 3c etc. will insure that the strips, when collapsed, will collapse radially outwardly rather than inwardly as might occur in some instances if the strips are arranged in parallel relation to the axis of the screw anchor as shown in Fig. 1.

Thus it will be seen that I have provided a highly efficient and improved screw anchor which is particularly suitable for use in door panels and the like of very small thickness, as well as in walls having very little spacing between the outer and inner partition, or in any other applications where a long screw anchor cannot be accommodated; furthermore I have provided a construction of screw anchor whereby the arms that are to be collapsed are extended radially inwardly slightly toward one end of the portion of the screw anchor so as to facilitate radially outward collapsing movement when a screw is turned in the screw anchor.

While I have illustrated and described a single embodiment of my invention, it will be understood that this is by way of illustration only, and that various changes and modifications may be made within the contemplation of my invention and within the scope of the following claims.

I claim:

1. A screw anchor of relatively small overall length for insertion into panels and the like having limited space behind them, comprising a one piece sheet metal strip having a circumferentially continuous intermediate portion that is drawn into an annular well portion of substantially U-shaped cross-section having an inner circumferential wall of uniform and substantially greater thickness than the outer circumferential wall of said well portion, the inner surface of said inner wall being screw threaded, a plurality of arms extending upwardly from, integral and aligned with the brim of said outer wall of the well portion, and in substantially parallel relationship with each other and with said inner wall and terminating in radially outwardly bent end portions shaped in the form of arcuate segments disposed in a plane at right angles to said arms and having ends in confronting relationship to form a washer-like end portion for said screw anchor, and a washer having outer and inner peripheral edges bent towards each other to form an annular well for clamping together said arcuate segments, said arms having weakened intermediate portions to insure initial outward bending of said arms thereat when the end portions of the screw anchor are pushed toward each other.

2. A screw anchor as recited in claim 1 wherein said arms are tapered radially inwardly in a longitudinal direction before being bent outwardly to form said arcuate segments.

3. A screw anchor as recited in claim 1 wherein said arcuate segments are of such arcuate length that their inner diameter is smaller than that of said outer circumferential wall, whereby said arms will be radially inwardly tapered throughout a portion thereof immediately before their connection with said radially outwardly bent end portions.

References Cited in the file of this patent

UNITED STATES PATENTS

| | | |
|---|---|---|
| 670,922 | Marquadt | Mar. 26, 1901 |
| 1,743,555 | Ledwinka | Jan. 14, 1930 |
| 2,098,556 | Tamada | Nov. 9, 1937 |
| 2,401,427 | Kimbell | June 4, 1946 |
| 2,538,601 | Taylor | Jan. 16, 1951 |